United States Patent [19]

Meunter et al.

[11] Patent Number: 4,504,702

[45] Date of Patent: Mar. 12, 1985

[54] ADDITIONAL LINE COUPLING CIRCUIT TO AN INTERCOM TELEPHONE SET

[75] Inventors: Bernard Meunter, Le Chesnay; Eric Gradeler, Sceaux, both of France

[73] Assignee: Compagnie Generale de Constructions Telephoniques, Paris, France

[21] Appl. No.: 509,790

[22] Filed: Jun. 30, 1983

[30] Foreign Application Priority Data

Jul. 12, 1982 [FR] France ................. 82 12169

[51] Int. Cl.³ .............................. H04M 1/74
[52] U.S. Cl. .................. 179/99 A; 179/18 AD
[58] Field of Search ............. 179/99 A, 18 AD, 81 R, 179/99 LS, 99 R, 18 FA, 18 C, 18 AH, 84 SS Primary Examiner—S. D. Schreyer
Attorney, Agent, or Firm—Sherman Levy

[57] ABSTRACT

An additional line coupling circuit to an intercom telephone set having inserted between the additional line and the intercom telephone set, a d.c. line uncoupling circuit as well as means coupled to one of the wires of the line for transmitting signals on the line and means connected to one or the other line wires for receiving the signals transmitted on the line.

4 Claims, 1 Drawing Figure

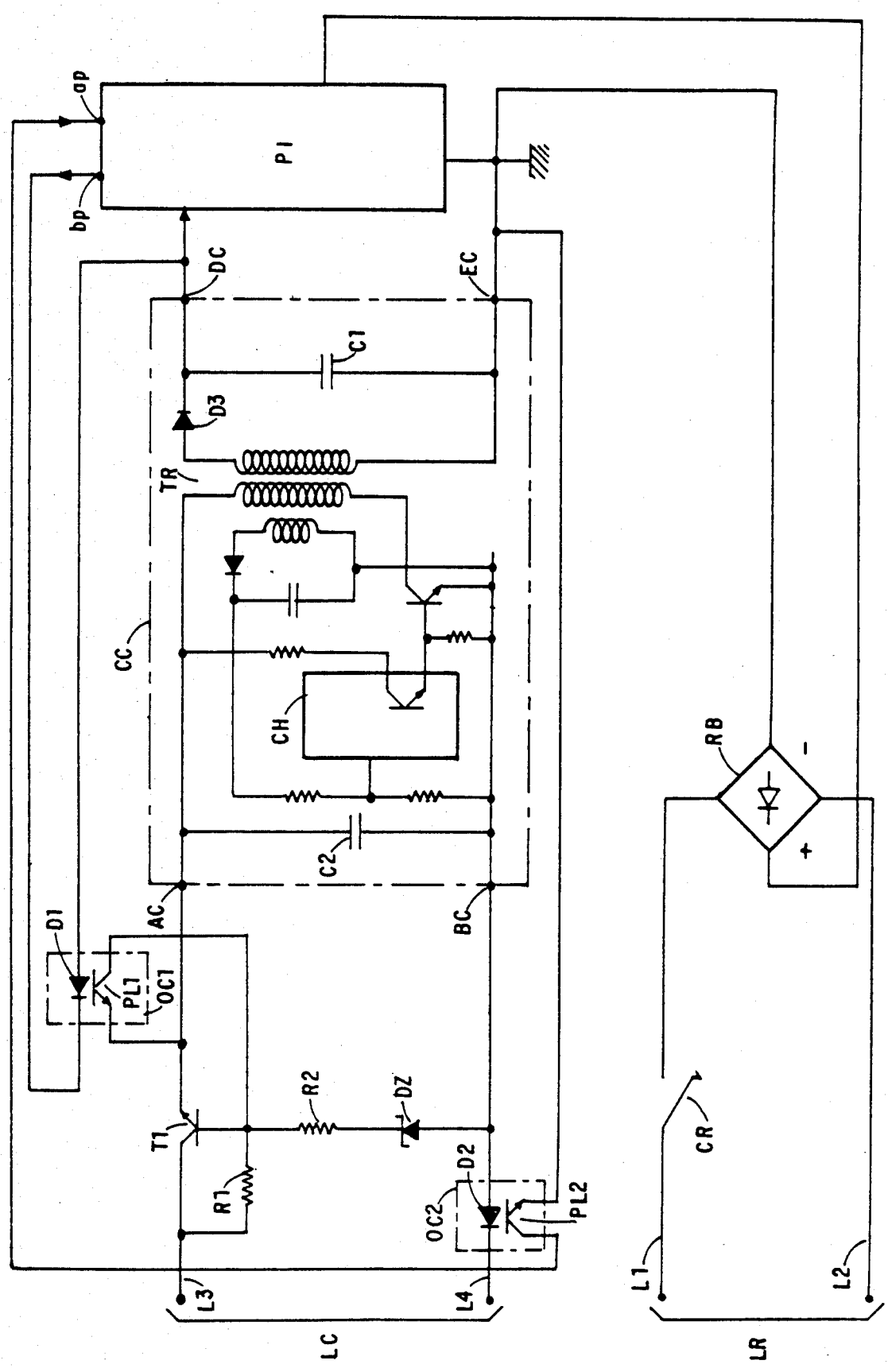

ADDITIONAL LINE COUPLING CIRCUIT TO AN INTERCOM TELEPHONE SET

The object of the present invention is a signalling line coupling circuit to an intercom telephone set. It is applicable in private telephone equipment.

Some private telephone equipment comprise ordinary telephone sets and intercom telephone sets. To each of the trunk lines corresponds on the intercom telephone set a display element which indicates the state of the line, namely wether it is free or busy. Information on this purpose is given to the intercom telephone set by a signalling channel which may have the form of a two-wire line also serving to the telephone set's power supply. The telephone set then comprises a processor for controlling the display elements and other basic operations such as identification and signalling of the state of the keys it is equipped with. Corresponding information is transmitted on the signalling channel. The signalling channels of the various telephone sets lead to an intercom processor which may be the same as the controlling processor of the telephone equipment.

Some telephone sets are used as emergency telephone sets: in the event of equipment failure each trunk line is directly connected, via security relay contacts, to a telephone set called emergency (telephone) set which will be able to keep on transmitting and receiving the calls during the length of this failure. There are generally provided as many emergency telephone sets as truck lines.

Although the switching of a trunk line on an ordinary telephone set can be done with no special precaution, it is not true with the switching of a trunk line on an intercom telephone set. Actually, this telephone set is connected by two supplied pairs. When it is used as emergency (telephone) set, one of these pairs is directly connected to a trunk line and is then supplied by the public exchange storage battery, while the other pair remains connected to the private exchange and is therefore supplied by the latter's storage battery. Each of these storage batteries has its own ground potential, which is not necessarily of the same value as the ground potential of the other storage battery. A current may therefore flow between these batteries and cause embarassing perturbancies.

The object of the invention is a coupling circuit between these lines and the intercom telephone set which permits to avoid such perturbancies.

The coupling circuit of the invention is characterized in that it comprises, inserted between the intercom telephone set and the signalling line, or additional line, a d.c. line uncoupling circuit, as well as means coupled to one of the wires of the line for transmitting signals on this line, and means connected to one or the other wires of the line for receiving signals transmitted on the line.

Different other objects and features will become more apparent and the invention will be best understood from the following description which is given as a non-restrictive example in connection with the accompanying drawing which represents an example of embodiment of the coupling circuit of the invention.

On the accompanying drawing an intercom telephone set PI is connected to two lines LR and LC.

The line LR is an ordinary private line: it comprises the wires L1 and L2 connected to the inputs of a rectifier bridge RB via the switch-hook CR of the telephone set. The negative output of this bridge provides the reference potential which will be called the ground potential. The positive output of this bridge is connected in a known manner to circuits—not shown—of telephone set PI such as the speech circuit and the digit sending circuit.

The line LC serving as signalling channel comprises two wires L3 and L4. The wire L3 is connected to the collector of a transistor T1 whose emitter is connected to an input AC of a d.c-d.c current-converter CC. The base electrode of this transistor is connected, on the one hand, to the line wire L3 via a resistor R1, and, on the other hand, to the collector of a phototransistor PL1 of an optocoupler OC1. The emitter of this phototransistor is connected to the emitter of transistor T1.

The wire L4 of line LC is connected to the cathode of a light-emitting diode D2 of an optocoupler OC2. The anode of this diode is connected, on the one hand, to an input BC of d.c-d.c current converter CC and, on the other hand, to the base electrode of transistor T1 via a Zenner effect diode DZ and a resistor R2 connected in series.

The emitter of phototransistor PL2 of optocoupler OC2 is connected to the ground potential, the collector of this transistor being connected to an input ap of telephone set PI.

An output EC of d.c-d.c current converter CC is connected to the ground potential, another output DC of this converter being connected, on the one hand, to an input—not referenced—of telephone set PI for the power supply, namely, of the keys scanning circuits and the display circuits and, on the other hand, to the anode of light-emitting diode D1 of optocoupler OC1. The cathode of this light-emitting diode is connected to an output bp of telephone set PI.

The d.c-d.c current converter CC is a circuit of the known type which will not be described with more detail. It will be mentioned, however, that such a circuit, which receives a d.c current voltage between its inputs AC and BC, namely comprises a capacitor C2 connected between these inputs and a chopping circuit CH whose output stage provides an a-c current voltage to a primary winding of a transformer TR. An a.c current voltage is therefore provided by the secondary winding of this transformer TR between the outputs DC and EC. This voltage is rectified and filtered by a diode D3 and a capacitor C1. The diode D3 is connected between an end of the secondary winding of transformer TR and the output DC, the capacitor being connected between the outputs DC and EC of converter CC.

The use of d.c-d.c current converter CC on connecting element between the line LC and the telephone set PI does therefore permit, via the transformer TR of this converter, to insure a d.c current uncoupling of this line, while transmitting to the telephone set PI the power conveyed by this d.c current.

Furthermore, under control of the microprocessor of telephone set PI, the sending of a level 0 signal to the output bp makes the light-emitting diode D1 of optocoupler OC1 conducting. It transmits a light signal. The phototransistor PL1 of this optocoupler conducts, saturates and turns off transistor T1 connected in series with the wire L3: the loop is open. Thus signals from the telephone set PI can indeed be transmitted on the line LC.

The signals received on this line are detected by the light-emitting diode D2 of optocoupler OC2. These signals are retransmitted by the phototransistor PL2 of this optocoupler to the telephone set PI.

Thus, the telephone set PI being used as emergency set, it is possible, in the event of a failure, to connect the pair LR directly to a trunk line by a security relay—not shown—the other pair or additional pair LC, used as signalling channel remaining connected to the private exchange. The d.c uncoupling of this line does indeed permit to avoid possible disturbancies which would be sure to cause the respective power supply of the two lines LR and LC by two separate storage batteries. Furthermore, the insertion of the two optocouplers OC1 and OC2 does indeed permit the two-way transmission of signals on the signalling channel with electrical isolation between the two-lines.

It is to be understood that the foregoing description has been given only as an unrestrictive example and that numerous other embodiments may be considered without departing from the scope of the invention.

We claim:

1. Additional line coupling circuit to an intercom telephone set, characterized in that it comprises, inserted between the additional line (LC) and the intercom telephone set (PI), a d.c line uncoupling circuit (CC), as well as means (OC1) coupled to one of the wires (L3) of the additional line for transmitting signals on the line (LC), and means (OC2) connected to another wire (L4) of the additional line wires for receiving the signals transmitted on the line.

2. Circuit as defined in claim 1, characterized in that the uncoupling circuit (CC) is a d.c-d.c current converter.

3. Circuit as defined in claim 1, characterized in that said transmission means (OC1) are composed of an optocoupler (OC1) comprising a phototransistor (PL1) which controls a transistor (T1) connected in series with said one wire (L3).

4. Circuit as defined in claim 1, characterized in that said reception means are composed of an optocoupler (OC2) comprising a light-emitting diode (D2) connected in series with said another wire (L4).

* * * * *

UNITED STATES PATENT AND TRADEMARK OFFICE
CERTIFICATE OF CORRECTION

PATENT NO. : 4,504,702
DATED : March 12, 1985
INVENTOR(S) : Bernard Meunier et al.

It is certified that error appears in the above-identified patent and that said Letters Patent is hereby corrected as shown below:

On the title page item (75) inventors "Meunter" should read --Meunier--.

Signed and Sealed this

Ninth Day of July 1985

[SEAL]

Attest:

DONALD J. QUIGG

Attesting Officer

Acting Commissioner of Patents and Trademarks